W. PRINTZ.
FERTILIZER DISTRIBUTING MACHINE.
APPLICATION FILED DEC. 13, 1921.

Patented Apr. 18, 1922.

UNITED STATES PATENT OFFICE.

WILHELM PRINTZ, OF KETTWIG, GERMANY.

FERTILIZER-DISTRIBUTING MACHINE.

1,413,132.　　　　Specification of Letters Patent.　　Patented Apr. 18, 1922.

Application filed December 13, 1921. Serial No. 522,155.

*To all whom it may concern:*

Be it known that I, WILHELM PRINTZ, a citizen of the German Republic, residing at Kettwig-Ruhr, Germany, have invented certain new and useful Improvements in Fertilizer-Distributing Machines, of which the following is a specification.

This invention relates to machines for distributing fertilizer.

Artificial fertilizer shows the inconvenient property that it very easily comes to stick and consequently can be caused with difficulty only, to pass through the distributing slots of the machine. This disadvantage can be substantially obviated by providing agitators and movable longitudinal plates, but in this case attention must be given to the cleaning of these parts.

Now the present invention relates to machines for distributing fertilizer which have two plates located at the inner surfaces of the longitudinal walls of the box and moving to and fro opposite to each other. The object of the invention is to so improve distributing machines of this kind that the plates can be easily removed for cleaning them.

Figure 1:
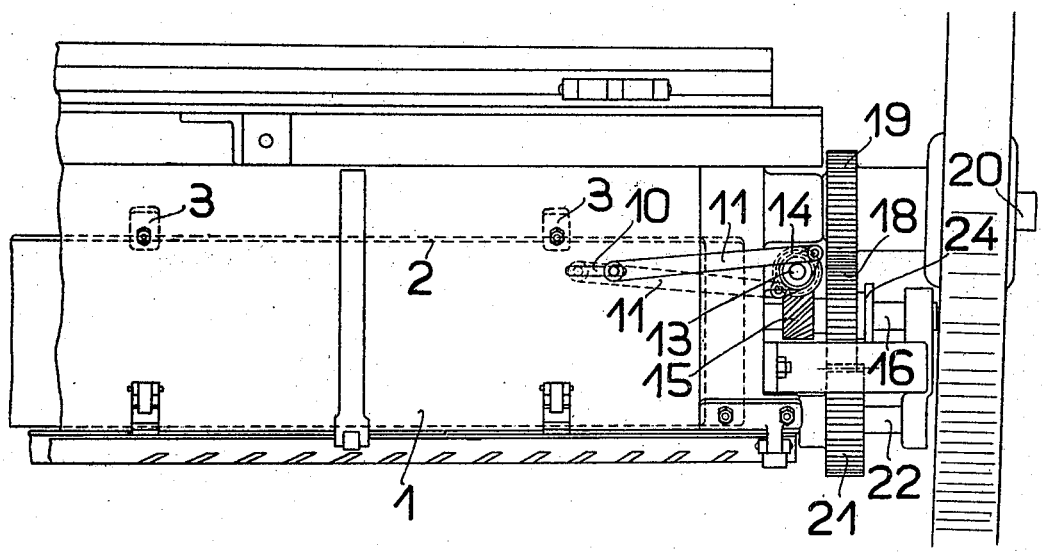
Figure 2:
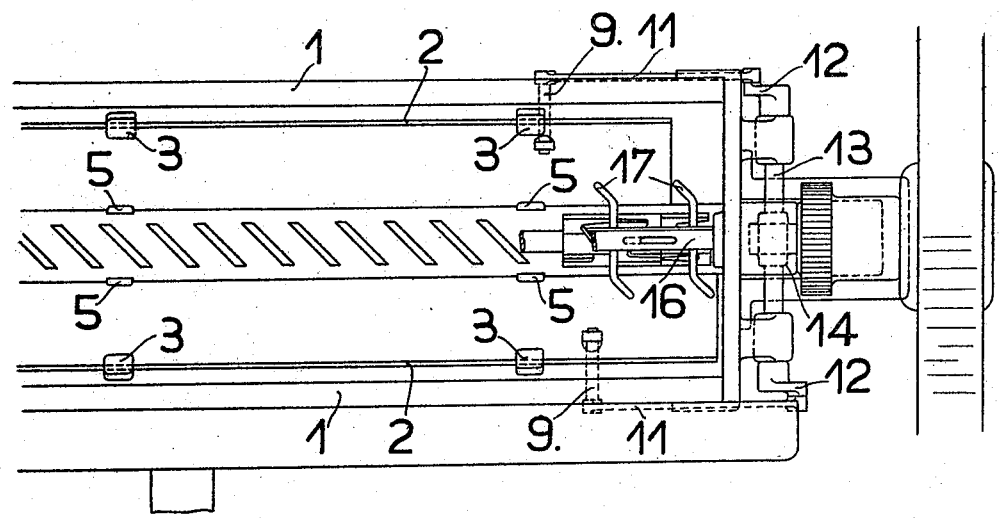
Figure 3:
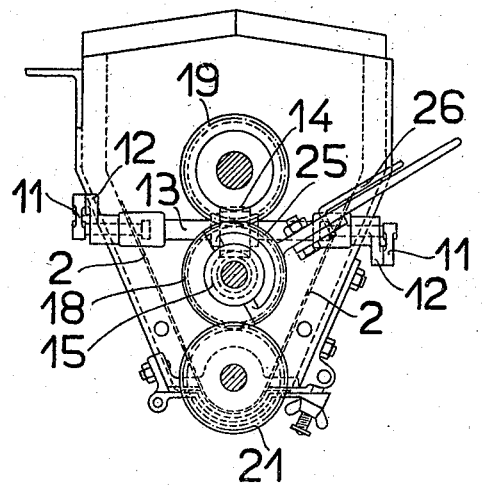
Figure 4:
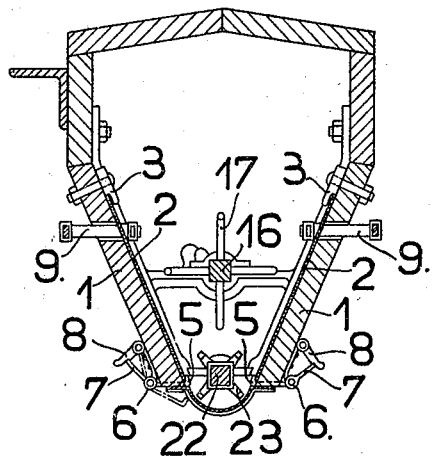

One embodiment of the subject-matter of the invention is illustrated by way of example in the accompanying drawing in which Fig. 1 shows a partial elevation and Fig. 2 a partial plan view of the machine, Figs. 3 and 4 are cross sections.

On the inside of the longitudinal walls 1 of the box of the machine there are provided two thin plates 2 extending upwardly at least up to the filling height of the box and the upper edge of which is engaged by lugs 3, their lower edge being supported by hooks 5 rotatably mounted at the box by means of pins 6. The hooks 5 are fitted with arms 7 which are locked by latches 8 in such a manner that the hooks are caused to remain in their raised position. After lifting the latches 8 the hooks can be turned and thus the plates 2 be withdrawn downwardly so that they may be cleaned in an easy and satisfying way.

The plates 2 carry arms 9 which project out of the box through slots 10 (see Fig. 1) provided in the longitudinal walls 1 and are connected, at their outer ends, to rods 11 attached to cranks 12. The two cranks 12 are fixed on a shaft 13 which in its turn is mounted on one of the front walls of the box and carries a worm wheel 14 meshing with another worm wheel 15. This latter is mounted on a longitudinal shaft 16 carrying also the agitator arms 17 and rotated by spur wheels 18, 19 from the shaft 20. By means of a spur wheel 21 the wheel 18 acts on a shaft 22 carrying the scrapers 23 which rotate within the trough-shaped detachable bottom of the box.

Owing to the rotation of the shaft 13 the plates 2 are caused, through the intermediary of the cranks 12, to make a to and fro motion opposite to each other so that the fertilizer cannot stick but uniformly sinks down along the walls 1 and is led off, through slots provided in the bottom by means of the agitator arms 17 and the scrapers 23.

The spur wheel 18 is shiftably arranged on the shaft 16 and is provided with a sleeve 24 which is embraced by a forked lever 25. This latter can be rocked by hand and fixed by means of a hook 26 (see Fig. 3). The spur wheel 18 and with it the other driving means of the plates 2 are thus capable of being thrown into or out of operation.

Claims.

1. A fertilizer distributing machine having a box receiving the fertilizer, shaking plates arranged in said box and disengageable members securing said plates in place with respect to said box.

2. A fertilizer distributing machine having a box receiving the fertilizer, shaking plates arranged in said box, fixed members securing said plates in place, with respect to said box, at one edge and disengageable members securing said plates in said place at the opposite edge.

3. A fertilizer distributing machine having a box receiving the fertilizer, shaking plates arranged in said box, notches on said box engaging the upper edge of said plates and levers pivoted on said box and supporting, in one position, the lower edge of said plates and releasing it when in the other position.

4. A fertilizer distributing machine having a box receiving the fertilizer, shaking plates arranged in said box, notches on said box engaging the upper edge of said plates and levers pivoted on said box and supporting, in one position, the lower edge of said plates and releasing it when in the other position and means for locking said levers in their supporting position.

5. A fertilizer distributing machine having a box receiving the fertilizer, shaking plates arranged in said box, notches on said box engaging the upper edge of said plate and double-armed levers pivoted on said box, one arm of each of said levers supporting, in one position, the lower edge of said plates and releasing it when in its other position, movable bolts lying, in one position, in the path of the other arm of said levers when the latter are in the supporting position and being out of said path when assuming their other position.

WILHELM PRINTZ.

Witnesses:
 JOHANN DECKERS,
 CARL MÜLLER.